(12) United States Patent
Sugiyama et al.

(10) Patent No.: US 11,418,678 B2
(45) Date of Patent: Aug. 16, 2022

(54) ELECTRONIC APPARATUS, COMMUNICATION APPARATUS, AND COMMUNICATION ABNORMALITY DETECTION METHOD FOR DETECTING COMMUNICATION ABNORMALITY OF SERIAL BUS

(71) Applicant: KYOCERA Document Solutions Inc., Osaka (JP)

(72) Inventors: Yuichi Sugiyama, Osaka (JP); Hideo Tanii, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/202,740

(22) Filed: Mar. 16, 2021

(65) Prior Publication Data

US 2021/0289100 A1    Sep. 16, 2021

(30) Foreign Application Priority Data

Mar. 16, 2020 (JP) .............................. JP2020-045232

(51) Int. Cl.
*H04N 1/32* (2006.01)
(52) U.S. Cl.
CPC ..... *H04N 1/32625* (2013.01); *H04N 1/32651* (2013.01); *H04N 2201/0094* (2013.01)
(58) Field of Classification Search
CPC ........... H04N 1/32625; H04N 1/32651; H04N 2201/0094
See application file for complete search history.

(56) References Cited

U.S. PATENT DOCUMENTS

| 2009/0313313 | A1* | 12/2009 | Yokokawa | ......... | G01D 5/24476 708/300 |
| 2014/0325300 | A1* | 10/2014 | Oka | .................. | G01R 31/31703 714/733 |
| 2021/0325951 | A1* | 10/2021 | Devarajan | ........... | G06F 13/4282 |

FOREIGN PATENT DOCUMENTS

JP        2014-133017 A    7/2014

* cited by examiner

*Primary Examiner* — Nicholas Pachol
(74) *Attorney, Agent, or Firm* — IP Business Solutions, LLC

(57) ABSTRACT

An electronic apparatus includes a first communication apparatus, a second communication apparatus, a serial bus, and a first control circuit. The second communication apparatus includes a storage device configured to store stored data. A first control circuit determines whether or not a first data amount of stored data serving as request target of request data matches a second data amount of stored data included in response data transmitted from the second communication apparatus via a second signal line of the serial bus in response to the transmission of the request data on the basis of a data amount specifying signal transmitted by a third signal line of the serial bus when the request data is transmitted from the first communication apparatus via a first signal line of the serial bus, and outputs a determination result.

8 Claims, 6 Drawing Sheets

ELECTRONIC APPARATUS, COMMUNICATION APPARATUS, AND COMMUNICATION ABNORMALITY DETECTION METHOD FOR DETECTING COMMUNICATION ABNORMALITY OF SERIAL BUS

INCORPORATION BY REFERENCE

This application claims priority to Japanese Patent Application No. 2020-045232 filed on 16 Mar. 2020, the entire contents of which are incorporated by reference herein.

BACKGROUND

The present disclosure relates to an electronic apparatus, a communication apparatus, and a communication abnormality detection method.

An electronic apparatus including a serial bus that connects a first communication apparatus to a second communication apparatus so that serial communication is possible is known. For example, the serial bus includes a first signal line that is used for data transmission from a first communication apparatus to a second communication apparatus, a second signal line that is used for data transmission from the second communication apparatus to the first communication apparatus, and a third signal line that is used for transmission of a clock signal from the first communication apparatus to the second communication apparatus. Further, an electronic device in which a status confirmation message is transmitted from a first communication apparatus to a second communication apparatus, and a communication abnormality of a serial bus is detected on the basis of content of a message transmitted from the second communication apparatus in response to the transmission of the status confirmation message is known.

SUMMARY

As an aspect of the present disclosure, a technology that is a further improvement of the above technology is proposed.

An electronic apparatus according to an aspect of the present disclosure includes a first communication apparatus, a second communication apparatus, a serial bus, and a first control circuit. The second communication apparatus includes a storage device configured to store stored data. The serial bus includes a first signal line used for transmission of request data including a request for readout of the stored data from the first communication apparatus to the second communication apparatus, a second signal line used for transmission of response data corresponding to the readout request from the second communication apparatus to the first communication apparatus, and a third signal line used for transmission of a data amount specifying signal for specifying a first data amount of the stored data serving as a readout target in the readout request included in the request data or a second data amount of the stored data included in the response data. The first control circuit includes a processor and functions as a determination processor and an output processor by the processor executing a control program. The determination processor determines whether or not the first data amount corresponding to the request data matches the second data amount corresponding to the response data transmitted from the second communication apparatus via the second signal line in response to the transmission of the request data on the basis of the data amount specifying signal when the request data is transmitted from the first communication apparatus via the first signal line. The output processor outputs a determination result of the determination processor.

The communication apparatus according to another aspect of the present disclosure includes a storage device, a connection device, and a control circuit. The storage device stores stored data. A serial bus is connected to the connection device, the serial bus including a first signal line used for transmission of request data including a request for readout of the stored data from another communication apparatus to the own apparatus, a second signal line used for transmission of response data corresponding to the readout request from the own apparatus to the other communication apparatus, and a third signal line used for transmission of a data amount specifying signal for specifying a first data amount of the stored data serving as a readout target in the readout request included in the request data. The control circuit includes a processor and functions as a determination processor and an output processor by the processor executing a control program. The determination processor determines whether or not a first data amount corresponding to the request data matches a second data amount of the stored data included in response data transmitted from the own apparatus via the second signal line in response to the transmission of the request data on the basis of the data amount specifying signal when the request data is transmitted from the other communication apparatus via the first signal line. The output processor outputs a determination result of the determination processor.

A communication abnormality detection method according to yet another aspect of the present disclosure is executed by an electronic apparatus including a first communication apparatus, a second communication apparatus including a storage device configured to store stored data, and a serial bus including a first signal line used for transmission of request data including a request for readout of the stored data from the first communication apparatus to the second communication apparatus, a second signal line used for transmission of response data corresponding to the readout request from the second communication apparatus to the first communication apparatus, and a third signal line used for transmission of a data amount specifying signal for specifying a first data amount of the stored data serving as a readout target in the readout request included in the request data or a second data amount of the stored data included in the response data. The communication abnormality detection method includes: determining whether or not the first data amount corresponding to the request data matches the second data amount corresponding to the response data transmitted from the second communication apparatus via the second signal line in response to the transmission of the request data on the basis of the data amount specifying signal when the request data is transmitted from the first communication apparatus via the first signal line; and outputting a result of the determination as to whether or not the first data amount matches the second data amount.

DETAILED DESCRIPTION

Hereinafter, embodiments of the present disclosure will be described with reference to the accompanying drawings. The following embodiments are examples in which the present disclosure is embodied, and do not limit the technical scope of the present disclosure.

Figure 1:
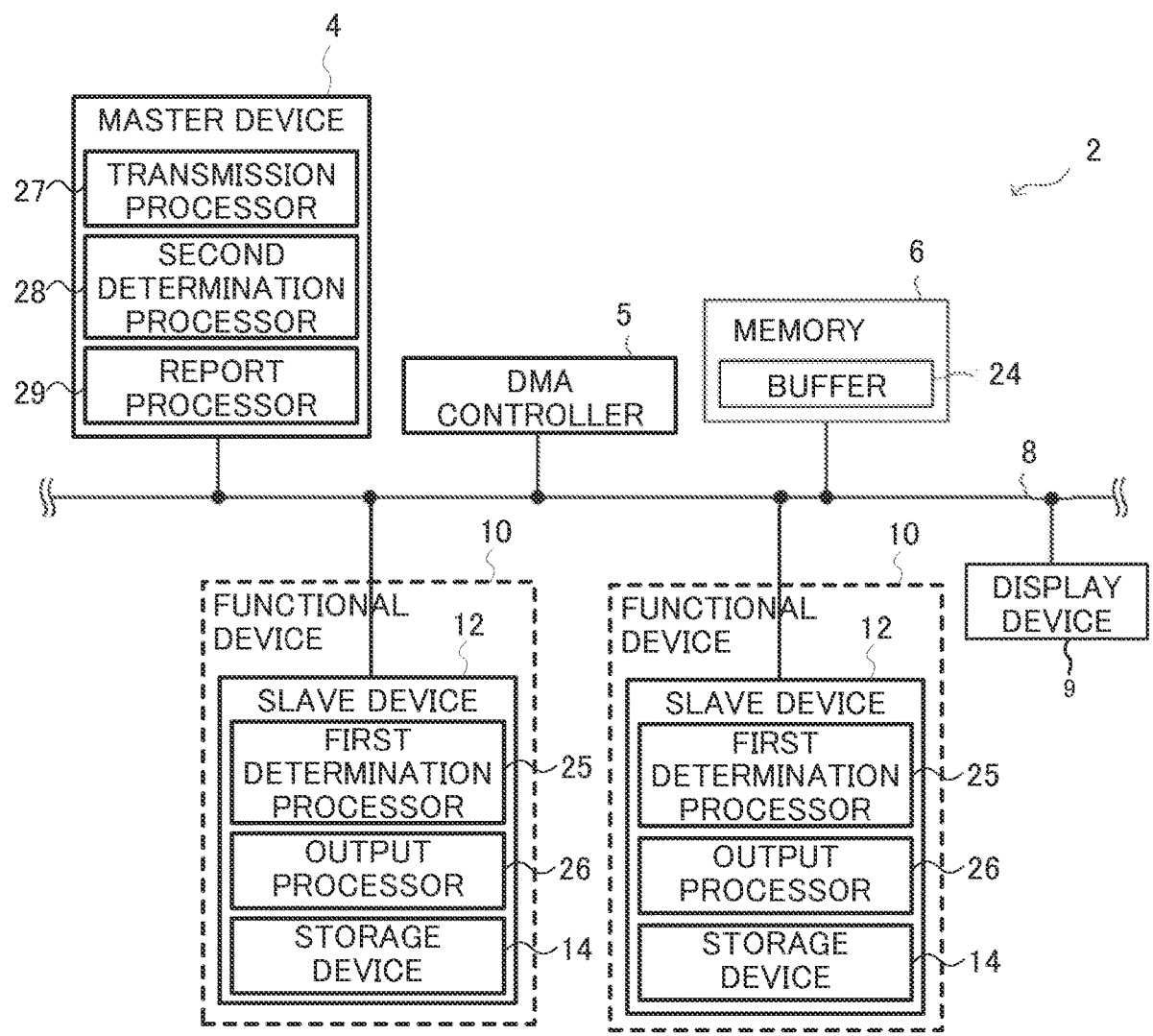
FIG. 1 is a block diagram illustrating a configuration of an image forming apparatus according to an embodiment of the present disclosure.
Figure 2:
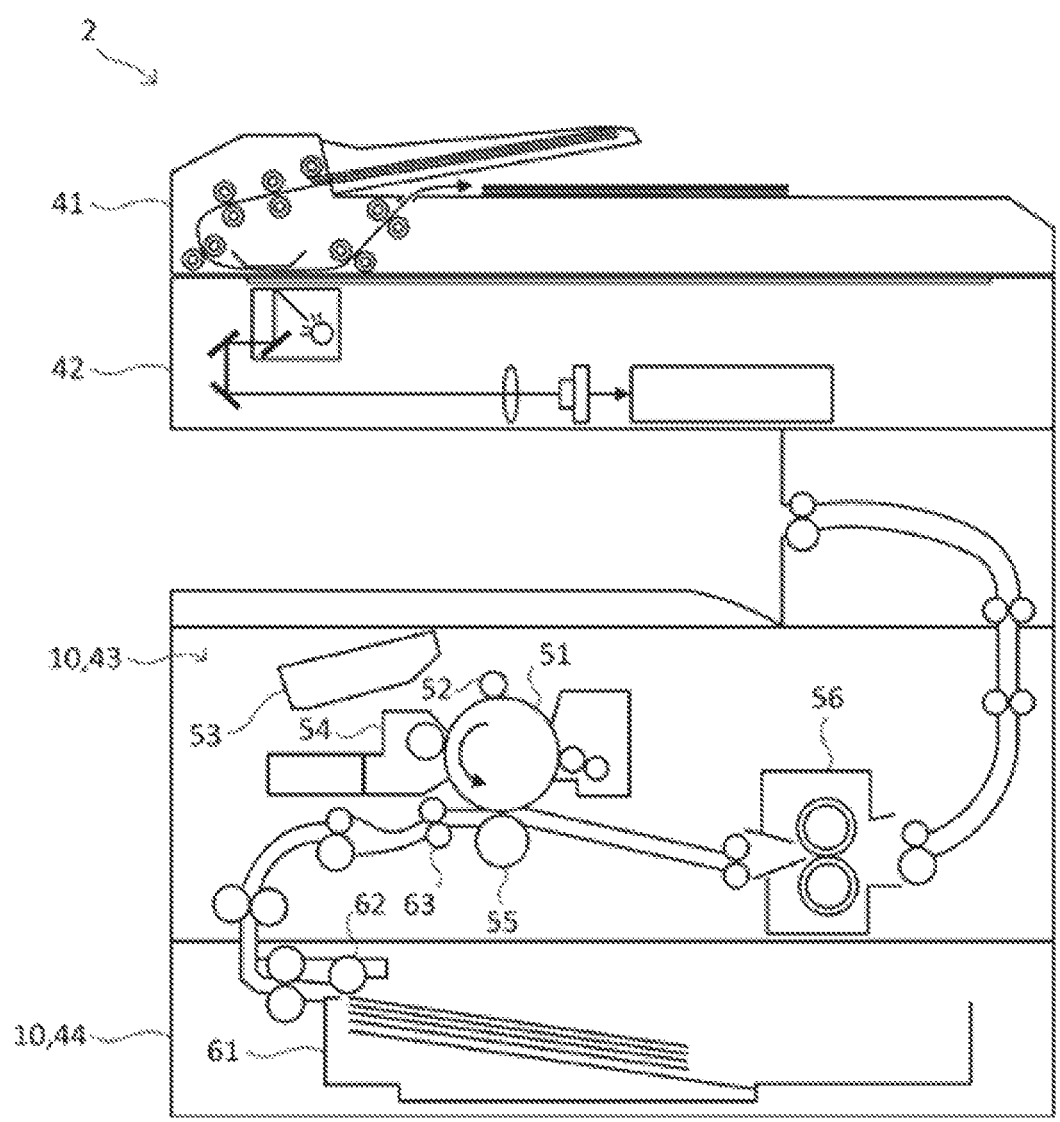
FIG. 2 is a cross-sectional view illustrating the configuration of the image forming apparatus according to the embodiment of the present disclosure.

First, a configuration of an image forming apparatus 2 according to an embodiment of the present disclosure will be described with reference to FIGS. 1 and 2. Here, FIG. 1 is a block diagram illustrating a configuration of the image forming apparatus 2. FIG. 2 is a cross-sectional view illustrating the configuration of the image forming apparatus 2.

As illustrated in FIG. 1, the image forming apparatus 2 (an example of an electronic apparatus in claims) includes a master device 4 (an example of a first communication apparatus in claims), a direct memory access (DMA) controller 5, a memory 6, a serial bus 8, a display device 9, and a plurality of functional devices 10 each provided with a slave device 12 (an example of a second communication apparatus in claims). The master device 4, the DMA controller 5, the memory 6, and the slave device 12 are communicatively connected to each other via the serial bus 8. In FIG. 1, each of the functional devices 10 is shown by a broken line.

Each of the plurality of functional devices 10 executes any one of the plurality of functions included in the image forming apparatus 2. For example, the image forming apparatus 2 has an image formation function for forming an image on the basis of image data, and one of the plurality of functional devices 10 is an image formation device 43 (see FIG. 2). The image forming apparatus 2 also has a paper feeding function for feeding a sheet on which an image is formed, and one of the plurality of functional devices 10 is a paper feeding device 44 (see FIG. 2). Although FIG. 1 illustrates two functional devices 10, the number of functional devices 10 included in the image forming apparatus 2 is not limited and may be one or may be three or more, for example.

The image formation device 43 can execute a function of forming an image on a sheet such as printing paper using an electrophotographic scheme, that is, an image formation function. As illustrated in FIG. 2, the image formation device 43 includes a photoconductor drum 51, a charging device 52, an exposure device 53, a developing device 54, a transfer device 55, and a fixing device 56. The charging device 52 charges a surface of the photoconductor drum 51 to a predetermined potential. The exposure device 53 irradiates the surface of the photoconductor drum 51 with laser light to expose the surface of the photoconductor drum 51 on the basis of the image data. The developing device 54 develops an electrostatic latent image on the photoconductor drum 51 formed by the exposure device 53. The transfer device 55 transfers a toner image formed on the photoconductor drum 51 by the developing device 54 to the sheet. The fixing device 56 heats and pressurizes the sheet to fix the toner image transferred to the sheet to the sheet.

The paper feeding device 44 can execute a function of feeding a sheet to the image formation device 43, that is, a paper feeding function. As illustrated in FIG. 2, the paper feeding device 44 includes a paper feeding cassette 61, a pickup roller 62, and a plurality of transport rollers 63. The paper feeding cassette 61 accommodates sheets that are used for printing and lifts the sheets to a position at which contact with the pickup roller 62 occurs. The pickup roller 62 transports the sheet accommodated in the paper feeding cassette 61 to a transport path formed inside the image forming apparatus 2. Each of the plurality of transport rollers 63 is provided in the transport path, and transports the sheet along the transport path.

One of the plurality of functional devices 10 may be an image reading device 42 (see FIG. 2) capable of executing an image reading function for reading an image from a document. Further, one of the plurality of functional devices 10 may be a document transport device 41 (see FIG. 2) capable of executing a document transport function for transporting the document read by the image reading device 42.

The slave device 12 controls the functional device 10 provided with the slave device 12. That is, the slave device 12 controls an operation of each component of the functional device 10 provided with the slave device 12 under the control of the master device 4 to realize a function corresponding to the functional device 10. The slave device 12 also notifies the master device 4 of a detection result of a sensor included in the functional device 10 provided with the slave device 12, for example. For example, the slave device 12 is a processor such as an application specific integrated circuit (ASIC).

Specifically, the slave device 12 includes a storage device 14. For example, the storage device 14 includes a plurality of registers. The storage device 14 stores control data that is used for control of the functional device 10. The slave device 12 controls the functional device 10 according to the control data stored in the storage device 14. The storage device 14 also stores detection data indicating the detection result of the sensor connected to the slave device 12. The detection data is transmitted to the master device 4. For example, the master device 4 generates control data to be transmitted to the slave device 12 on the basis of the detection data received from the slave device 12.

The memory 6 stores various types of data. For example, the memory 6 is a semiconductor memory such as a random access memory (RAM) and a flash memory. The memory 6 stores control data to be transmitted to the slave device 12. The memory 6 also stores the detection data received from the slave device 12.

The DMA controller 5 executes a data transfer process for transferring data between the memory 6 and the slave device 12 via the serial bus 8 in response to an instruction from the master device 4. The data transfer process includes a first transfer process for transferring the control data stored in the memory 6 to the slave device 12. The data transfer process also includes a second transfer process for transferring the detection data stored in the storage device 14 of the slave device 12 to the memory 6.

As illustrated in FIG. 1, the memory 6 includes a buffer 24. The buffer 24 stores execution request data indicating a request for execution of a data transfer process. For example, the execution request data includes transfer source information indicating a transfer source of transfer target data, transfer destination information indicating a transfer destination of the transfer target data, data amount information indicating a data amount of the transfer target data, and the like. The buffer 24 has a storage capacity capable of storing a plurality of pieces of execution request data. The buffer 24 stores execution request data generated during an operation of the image forming apparatus 2.

For example, execution request data indicating the request for execution of the first transfer process includes transfer source information indicating an address of the memory 6 in which the control data that is the transfer target data is stored, transfer destination information indicating an address of the storage device 14 to which the control data is written, and data amount information indicating a data amount of control data.

Execution request data indicating a request for execution of the second transfer process includes transfer source information indicating an address of the storage device 14 in which the detection data that is the transfer target data is stored, transfer destination information indicating an address of the memory 6 to which the detection data is written, and data amount information indicating a data amount of the detection data.

The execution request data may indicate a request for execution of the data transfer process for continuously transferring a plurality of pieces of transfer target data. That is, the execution request data may include a plurality of pieces of transfer source information, a plurality of pieces of transfer destination information, and a plurality of pieces of data amount information. Further, the buffer 24 may be provided outside the memory 6.

The master device 4 executes serial communication with a communication apparatus connected to the serial bus 8. Here, serial communication is a communication scheme in which serial data is sequentially transmitted one bit at a time on a transmission path in telecommunications. The master device 4 performs serial communication according to a communication protocol set in the image forming apparatus 2. For example, the master device 4 is a processor such as a central processing unit (CPU).

Specifically, the master device 4 executes serial communication with the slave device 12 via the DMA controller 5 on the basis of the execution request data stored in the buffer 24. The master device 4 may execute serial communication with the slave device 12 without the DMA controller 5.

Next, data communication using the serial bus 8 that is executed by the image forming apparatus 2 will be described with reference to FIGS. 3 and 4. Here, FIG. 4 illustrates an example of an electric signal that is output from each signal line of the serial bus 8 when the master device 4 reads the stored data stored in the storage device 14 of any one of the slave devices 12.

Figure 3:
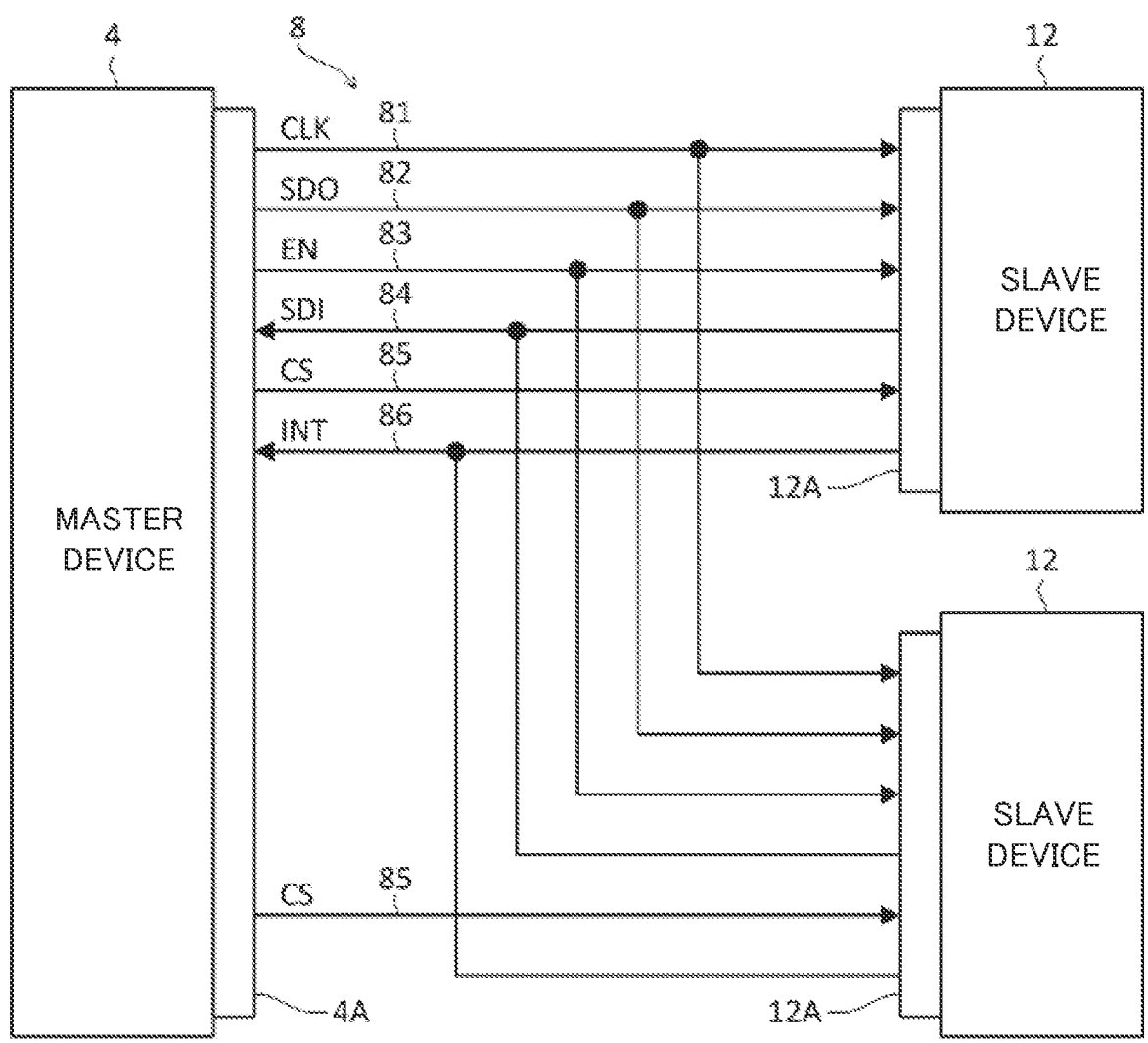
FIG. 3 is a diagram illustrating a configuration of a serial bus of the image forming apparatus according to the embodiment of the present disclosure.

As illustrated in FIG. 3, the serial bus 8 includes six signal lines including a CLK signal line 81, an SDO signal line 82, an EN signal line 83, an SDI signal line 84, a CS signal line 85, and an INT signal line 86. The CLK signal line 81 (an example of a third signal line in claims) is used for transmission of a clock signal SIG10 (see FIG. 4) from the master device 4 to the slave device 12. The SDO signal line 82 (an example of a first signal line in claims) is used for data transmission from the master device 4 to the slave device 12. The EN signal line 83 is used for transmission of a notification of completion of the data transmission using the SDO signal line 82. The SDI signal line 84 (an example of a second signal line in claims) is used for data transmission from the slave device 12 to the master device 4. The CS signal line 85 is used for transmission of a notification of start and end of data communication from the master device 4 to the slave device 12 using the serial bus 8. The INT signal line 86 is used for transmission of a notification of completion of data transmission from the slave device 12 to the master device 4 using the SDI signal line 84.

As illustrated in FIG. 3, the CLK signal line 81 includes a common portion common to a plurality of slave devices 12 and a branch portion branching from the common portion to each of the slave devices 12. The SDO signal line 82, the EN signal line 83, the SDI signal line 84, and the INT signal line 86 also include a common portion and a branch portion like the CLK signal line 81. The CS signal line 85 is provided in each slave device 12. The master device 4 includes a connection device 4A to which the serial bus 8 is connected. The slave device 12 includes a connection device 12A to which the serial bus 8 is connected. The serial bus 8 may not include the EN signal line 83.

Figure 4:
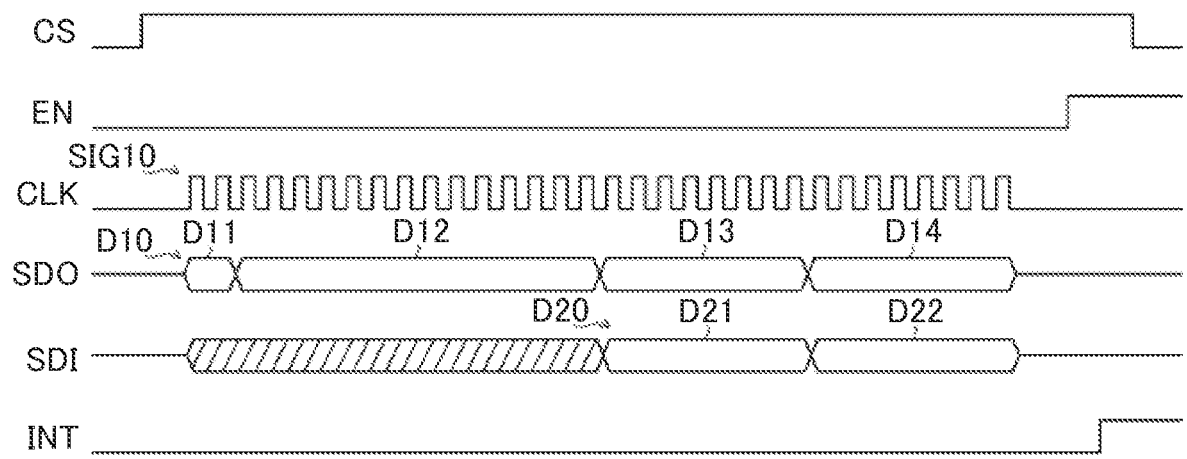
FIG. 4 is a timing chart illustrating an example of data communication using the serial bus of the image forming apparatus according to the embodiment of the present disclosure.

As illustrated in FIG. 4, when the master device 4 reads out the stored data from the storage device 14 of any one of the slave devices 12, the master device 4 first asserts the CS signal line 85 corresponding to the slave device 12 serving as a communication partner. Then, the master device 4 outputs the clock signal SIG10 having a predetermined frequency to the CLK signal line 81, and outputs request data D10 including the request for readout of the stored data to the SDO signal line 82. Specifically, the master device 4 causes the request data D10 to be transmitted bit by bit to the SDO signal line 82 according to a clock period of the clock signal SIG10.

Here, the request data D10 includes command data D11, address data D12, size data D13, and checksum data D14, as illustrated in FIG. 4. The command data D11 includes, for example, information indicating a type of readout request that is transmitted to the slave device 12. Types of readout request include a first readout request for requesting readout of the stored data having a predetermined size included in an address range continuous from a start address, with one address designated by the address data D12 as the start address, and a second readout request for requesting readout of the stored data from each of a plurality of addresses designated by the address data D12. The address data D12 includes information indicating an address of the stored data that is a readout target. When the readout request is the first readout request, the number of addresses included in the address data D12 is one. When the readout request is the second readout request, the number of addresses included in the address data D12 is plural. FIG. 4 illustrates the address data D12 including one address. The size data D13 includes information indicating the size of the stored data that is a readout target. The checksum data D14 is used for the slave device 12 that receives the request data D10 to perform error detection of the request data D10.

When the master device 4 ends the output of the clock signal SIG10 and the request data D10, the master device 4 asserts the EN signal line 83 to notify of the completion of data transmission, and then negates the CS signal line 85.

On the other hand, when the CS signal line 85 is asserted, the slave device 12 serving as the communication partner waits for the reception of the clock signal SIG10 that is transmitted from the master device 4. When the slave device 12 receives the clock signal SIG10, the slave device 12 receives the request data D10 that is transmitted together with the clock signal SIG10. Specifically, the slave device 12 receives the request data D10 bit by bit according to the clock period of the clock signal SIG10. The slave device 12 identifies content of the readout request transmitted from the master device 4 on the basis of the received request data D10.

When the slave device 12 identifies the content of the readout request included in the request data D10, the slave device 12 outputs response data D20 corresponding to the content of the readout request to the SDI signal line 84. Specifically, the slave device 12 transmits the response data D20 bit by bit according to the clock period of the clock signal SIG10. For example, the slave device 12 starts transmission of the response data D20 according to a reception start timing of the size data D13.

Here, the response data D20 includes readout target data D21 and checksum data D22, as illustrated in FIG. 4. The readout target data D21 is the stored data that is a readout target in the readout request included in the request data D10. The checksum data D22 is used for the master device 4 that receives the response data D20 to perform error detection of the response data D20, like the checksum data D14.

When the input of the clock signal SIG10 and the output of the response data D20 end and then the EN signal line 83 is asserted, the slave device 12 asserts the INT signal line 86 to notify of the completion of data transmission.

The master device 4 outputs the clock signal SIG10 including the number of clocks required for the slave device 12 to receive the request data D10. In other words, the master device 4 outputs the clock signal SIG10 including the number of clocks corresponding to the number of bits of the request data D10.

The master device 4 also outputs the clock signal SIG10 including the number of clocks required for the slave device 12 to transmit the response data D20. In other words, the master device 4 outputs the clock signal SIG10 including the number of clocks corresponding to the number of bits of the response data D20. The master device 4 can specify the number of bits of the response data D20 on the basis of the size of the stored data that is a readout target. Here, the clock signal SIG10 is a signal including the number of clocks corresponding to the size (a first data amount to be described below) of the stored data that is a readout target in the readout request included in the request data D10, and is an example of a data amount specifying signal in claims.

Incidentally, it is conceivable that the master device 4 transmits the request data D10 including the readout request in which the stored data stored at a first address of the storage device 14 of the slave device 12 is a readout target, and detects a communication abnormality of the serial bus 8 on the basis of content of the response data D20 transmitted from the slave device 12 to the master device 4 in response to the transmission of the request data D10.

However, in the above scheme, the detection of the communication abnormality of the serial bus 8 caused by the disconnection of the SDO signal line 82 may fail depending on stored content of the storage device 14. Specifically, in the image forming apparatus 2, when the request data D10 is transmitted from the master device 4 in a state in which the SDO signal line 82 is disconnected, data of "000 . . . " or "111 . . . " is received in the slave device 12, but the slave device 12 recognizes that this data is data for requesting readout of stored data stored at a second address different from the first address in the storage device 14. Therefore, when the data stored at the second address of the storage device 14 is the same as the data stored at the first address, the communication abnormality of the serial bus 8 caused by disconnection of the SDO signal line 82 cannot be detected on the basis of the content of the response data D20 transmitted from the slave device 12.

On the other hand, in the image forming apparatus 2 according to the embodiment of the present disclosure, it is possible to detect the communication abnormality of the serial bus 8 caused by disconnection of the SDO signal line 82 that is used for data transmission from the master device 4 to the slave device 12 regardless of the stored content of the storage device 14 of the slave device 12, as will be described below.

Specifically, the slave device 12 functions as a first determination processor 25 (an example of a determination processor in claims) and an output processor 26 by a processor executing a control program stored in a ROM or the like, as illustrated in FIG. 1.

When the request data D10 is transmitted by the master device 4, the first determination processor 25 determines whether or not the first data amount of the stored data that is a readout target in the readout request included in the request data D10 matches the second data amount of the stored data included in the response data D20 transmitted by the slave device 12 in response to the transmission of the request data D10 on the basis of the clock signal SIG10.

For example, the first determination processor 25 receives the clock signal SIG10 and the request data D10 transmitted from the master device 4, and then determines whether or not the first data amount matches the second data amount on the basis of the clock signal SIG10 when the EN signal line 83 is asserted.

For example, the first determination processor 25 determines that the first data amount matches the second data amount when a reception end timing of the clock signal SIG10 matches a transmission end timing of the response data D20. The first determination processor 25 also determines that the first data amount does not match the second data amount when the reception end timing of the clock signal SIG10 does not match the transmission end timing of the response data D20.

The output processor 26 outputs a determination result of the first determination processor 25.

For example, when the first determination processor 25 determines that the first data amount matches the second data amount, the output processor 26 asserts the INT signal line 86 to notify the master device 4 of the completion of the data transmission. On the other hand, when the first determination processor 25 determines that the first data amount does not match the second data amount, the output processor 26 does not assert the INT signal line 86. That is, the output processor 26 asserts the INT signal line 86 to notify that the first determination processor 25 has determined that the first data amount matches the second data amount.

The master device 4 also includes a transmission processor 27, a second determination processor 28, and a report processor 29, as illustrated in FIG. 1. The master device 4 executes a communication status confirmation program stored in a read only memory (ROM). Accordingly, the master device 4 functions as the transmission processor 27, the second determination processor 28, and the report processor 29. The communication status confirmation program may be recorded on a computer-readable recording medium such as a compact disc (CD), a digital versatile disc (DVD), or a flash memory, read from the recording medium, and installed in non-volatile storage device that is provided in the image forming apparatus 2.

The transmission processor 27 transmits predetermined second request data to the slave device 12. Here, the second request data is the request data D10 of which the first data amount differs from that of first request data that is received by the slave device 12 via the SDO signal line 82 in a disconnected state.

Specifically, the first request data is data of "000 . . . " that is received by the slave device 12 when the request data D10 is transmitted from the master device 4 in a state in which the SDO signal line 82 is disconnected. For example, in the image forming apparatus 2, the slave device 12 recognizes that the data of "000 . . . " is data for requesting readout of the stored data of one byte included in an address range continuous from a start address, with the second address of the storage device 14 as the start address. That is, the first data amount of the first request data is one byte.

For example, the second request data is request data D10 including a readout request in which predetermined specific stored data having a first data amount of 2 bytes is a readout target. For example, the specific stored data is initial setting data that is stored in the storage device 14 of the slave device 12 determined for each slave device 12 in advance, and is data different from predetermined specific data. Here, the specific data is data that is the same as the stored data included in the data of "000 . . . " received in the master device 4 when the response data D20 is transmitted from the slave device 12 in a state in which the SDI signal line 84 is disconnected.

For example, the transmission processor 27 transmits the second request data to the slave device 12 when a predetermined transmission timing arrives. Here, the transmission timing is, for example, a time when the image forming apparatus 2 is powered on and a time when an operation mode of the image forming apparatus 2 is switched from a power saving mode in which power consumption is lower than in a normal mode to the normal mode. The transmission timing may be a timing that can be arbitrarily set.

The second determination processor 28 determines whether or not the stored data included in the response data D20 transmitted from the slave device 12 in response to the transmission of the second request data from the transmission processor 27 is the specific stored data.

When the output processor 26 does not notify of a determination result indicating that the first data amount matches the second data amount in response to the transmission of the second request data from the transmission processor 27, the report processor 29 reports the occurrence of a communication abnormality of the serial bus 8.

For example, the report processor 29 reports the occurrence of the communication abnormality of the serial bus 8 when the INT signal line 86 is not asserted in response to the transmission of the second request data from the transmission processor 27.

When the second determination processor 28 determines that the stored data included in the response data D20 transmitted from the slave device 12 in response to the transmission of the second request data is not the specific stored data, the report processor 29 also reports the occurrence of the communication abnormality of the serial bus 8.

That is, in the image forming apparatus 2, when the output processor 26 does not notify of the determination result indicating that the first data amount matches the second data amount in response to the transmission of the second request data from the transmission processor 27, the occurrence of the communication abnormality in the serial bus 8 is detected. Further, in the image forming apparatus 2, when the second determination processor 28 determines that the stored data included in the response data D20 transmitted from the slave device 12 in response to the transmission of the second request data is not the specific stored data, occurrence of a communication abnormality in serial bus 8 is detected.

[Communication Status Confirmation Process]

Figure 5:
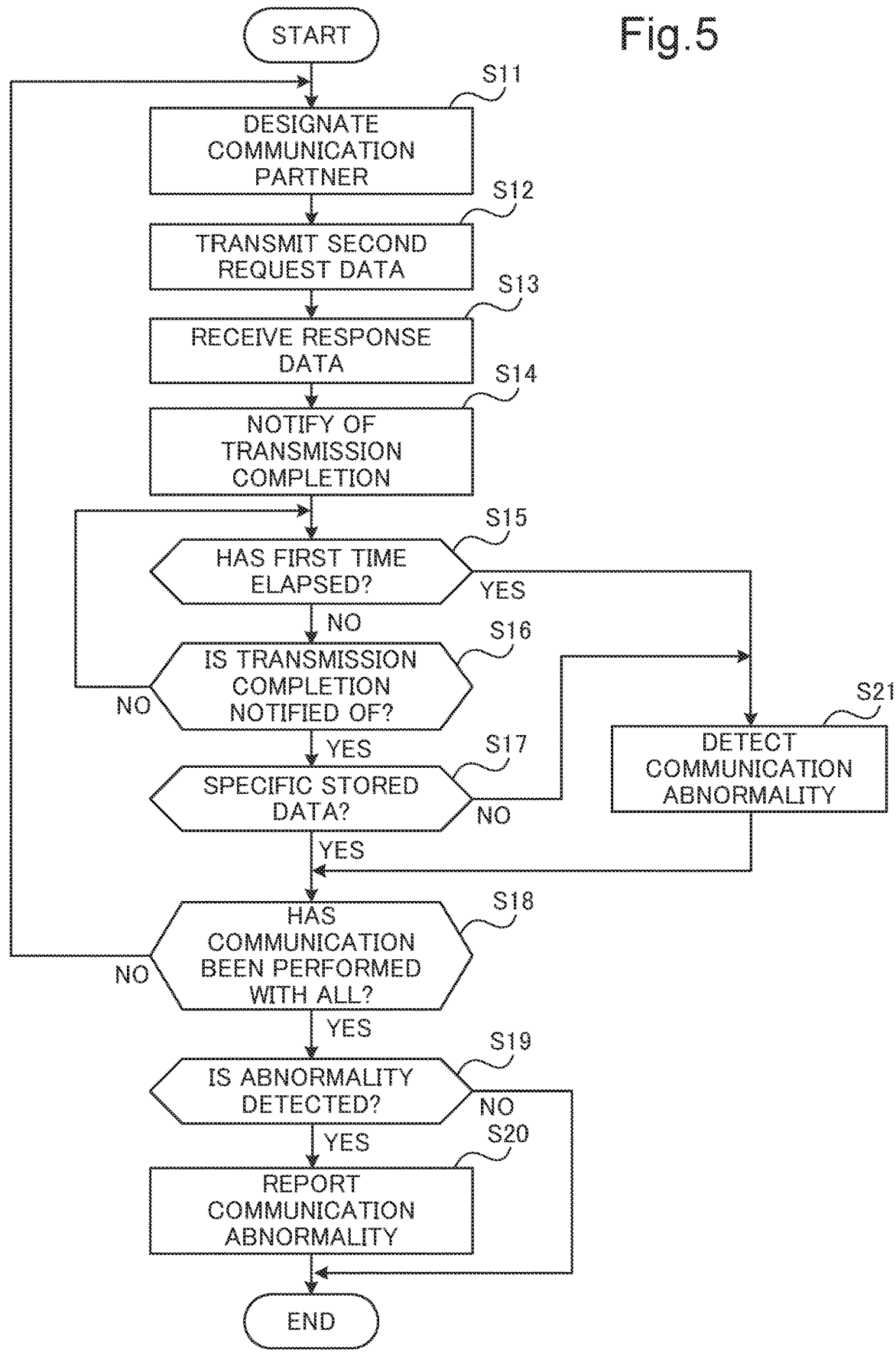
FIG. 5 is a flowchart illustrating an example of a communication state confirmation process that is executed by the image forming apparatus according to the embodiment of the present disclosure.

Hereinafter, an example of a procedure of the communication status confirmation process that is executed by the master device 4 in the image forming apparatus 2 will be described with reference to FIG. 5. Here, S11, S12, . . . indicate numbers of processing procedures (steps) that are executed by the master device 4. For example, the communication status confirmation process is executed when the transmission timing arrives.

<Step S11>

First, in step S11, the master device 4 designates the slave device 12 serving as a communication partner. Specifically, the master device 4 asserts the CS signal line 85 corresponding to the slave device 12 serving as the communication partner.

<Step S12>

In step S12, the master device 4 transmits the clock signal SIG10 and the second request data to the slave device 12 using the CLK signal line 81 and the SDO signal line 82. Specifically, the master device 4 transmits the second request data bit by bit according to the clock period of the clock signal SIG10. Here, the process of step S12 is executed by the transmission processor 27 of the master device 4.

<Step S13>

In step S13, the master device 4 receives the response data D20 that is transmitted from the slave device 12 in response to the transmission of the second request data in step S12. Specifically, the master device 4 receives the response data D20 bit by bit according to the clock period of the clock signal SIG10.

<Step S14>

In step S14, the master device 4 notifies of the completion of data transmission after the transmission of the clock signal SIG10 and the second request data ends. Specifically, the master device 4 asserts the EN signal line 83.

<Step S15>

In step S15, the master device 4 determines whether or not a predetermined first time has elapsed from the execution of the process of step S14. The first time is an arbitrary time set for waiting for the notification of the completion of the data transmission from the slave device 12.

Here, when the master device 4 determines that the first time has elapsed from the execution of the process of step S14 (Yes in step S15), the master device 4 shifts the process to step S21. Further, when the first time has not elapsed from the execution of the process of step S14 (No in step S15), the master device 4 shifts the process to step S16.

<Step S16>

In step S16, the master device 4 determines whether or not the slave device 12 has notified of the completion of data transmission. Specifically, the master device 4 determines that the slave device 12 has notified of the completion of data transmission when the INT signal line 86 is asserted.

Here, when the master device 4 determines that the slave device 12 has notified of the completion of data transmission (Yes in step S16), the master device 4 shifts the process to step S17. Further, when the slave device 12 has not notified of the completion of data transmission (No in step S16), the master device 4 shifts the process to step S15.

<Step S17>

In step S17, the master device 4 determines whether or not the stored data included in the response data D20 received in step S13 is the specific stored data. Here, a process of step S17 is executed by the second determination processor 28 of the master device 4.

Here, when the master device 4 determines that the stored data included in the response data D20 is the specific stored data (Yes in step S17), the master device 4 shifts the process to step S18. Further, when the stored data included in the response data D20 is not the specific stored data (No in step S17), the master device 4 shifts the process to step S21.

For example, when the SDI signal line 84 is disconnected, the response data D20 received from the slave device 12 in the master device 4 becomes "000 . . . ". Therefore, the stored data included in the response data D20 received in step S13 differs from the specific stored data, and the occurrence of the communication abnormality in the serial bus 8 is detected in step S21 below.

<Step S21>

In step S21, the master device 4 detects occurrence of a communication abnormality on the serial bus 8. For example, the master device 4 stores the identification information of the slave device 12 that is the communication partner in a predetermined storage area of the memory 6.

<Step S18>

In step S18, the master device 4 determines whether or not communication has been performed with all of the slave devices 12.

Here, when the master device 4 determines that communication has been performed with all of the slave devices 12 (Yes in step S18), the master device 4 shifts the process to step S19. Further, when communication has not been performed with all of the slave devices 12 (No in step S18), the master device 4 shifts the process to step S11. In this case, the master device 4 designates the slave device 12 with which communication has not yet been performed as the communication partner in a subsequent process of step S11.

<Step S19>

In step S19, the master device 4 determines whether or not a communication abnormality is detected during communication with any one of the slave devices 12. For example, when the identification information of any slave device 12 is stored in the storage area of the memory 6, the master device 4 determines that the communication abnormality has been detected during communication with the slave device 12 corresponding to the identification information stored in the storage area.

Here, when the master device 4 determines that the communication abnormality has been detected during communication with any one of the slave devices 12 (Yes in step S19), the master device 4 shifts the process to step S20. Further, when no communication abnormality has been detected during communication with any one of the slave devices 12 (No in step S19), the master device 4 ends the communication status confirmation process.

<Step S20>

In step S20, the master device 4 reports the occurrence of the communication abnormality in the serial bus 8. Here, the process of step S20 is executed by the report processor 29 of the master device 4.

For example, the master device 4 causes the display device 9 to display a message indicating that the communication abnormality has occurred in the serial bus 8 and indicating the slave device 12 that has been communicating when the abnormality occurrence is detected.

[Response Data Transmission Process]

Figure 6:
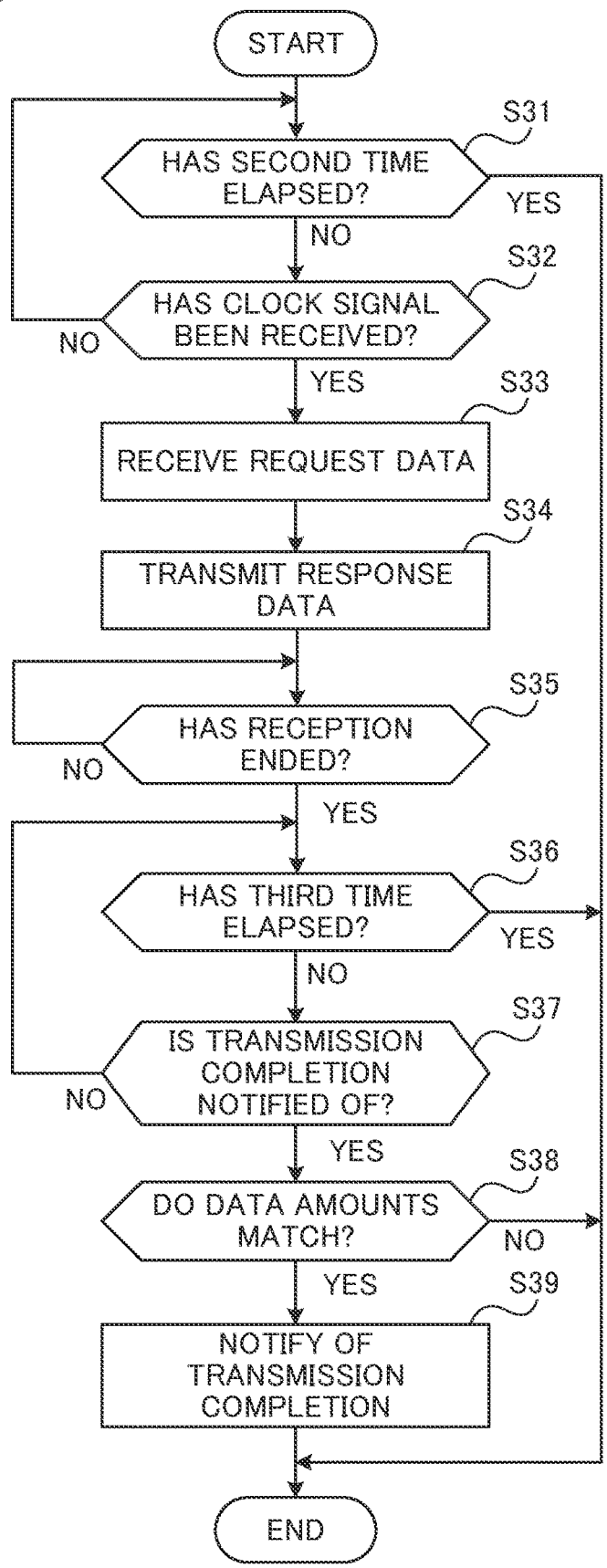
FIG. 6 is a flowchart illustrating an example of a response data transmission process that is executed by the image forming apparatus according to the embodiment of the present disclosure.

Next, a procedure of the response data transmission process that is executed by the slave device 12 in the image forming apparatus 2 will be described with reference to FIG. 6. The response data transmission process is executed in the slave device 12 designated as a communication partner in the process of step S11 when the process of step S11 of the communication status confirmation process is executed.

<Step S31>

First, in step S31, the slave device 12 determines whether or not a predetermined second time has elapsed from the start of the response data transmission process. The second time is an arbitrary time set for waiting for the reception of the clock signal SIG10 from the master device 4.

Here, when the slave device 12 determines that the second time has elapsed from the start of the response data transmission process (Yes in step S31), the slave device 12 ends the response data transmission process. Further, when the second time has not elapsed from the start of the response data transmission process (No in step S31), the slave device 12 shifts the process to step S32.

<Step S32>

In step S32, the slave device 12 determines whether or not the clock signal SIG10 has been received.

Here, when the slave device 12 determines that the clock signal SIG10 has been received (Yes in step S32), the process proceeds to step S33. Further, when the clock signal SIG10 has not been received (No in step S32), the slave device 12 shifts the process to step S31.

For example, when the clock signal SIG10 is disconnected, the slave device 12 cannot receive the clock signal SIG10 even when the clock signal SIG10 is transmitted from the master device 4. In this case, since the second time elapses before the reception of the clock signal SIG10 is confirmed in the slave device 12, the response data transmission process ends. Since the response data transmission process ends without the slave device 12 notifying of the completion of the data transmission (without executing the process of step S39), occurrence of a communication abnormality in the serial bus 8 is detected in step S21 of the communication state confirmation process.

<Step S33>

In step S33, the slave device 12 receives the request data D10. Specifically, the slave device 12 receives the request data D10 bit by bit according to the clock period of the clock signal SIG10 input from the master device 4.

Here, when the SDO signal line 82 is not disconnected, the request data D10 received by the slave device 12 is the second request data transmitted in step S12 of the communication status confirmation process. On the other hand, when the SDO signal line 82 is disconnected, the request data D10 that is received by the slave device 12 is the first request data of "000 . . . ".

<Step S34>

In step S34, the slave device 12 transmits the response data D20 corresponding to the request data D10 received in step S33. Specifically, the slave device 12 transmits the response data D20 bit by bit according to the clock period of the clock signal SIG10 input from the master device 4.

Specifically, when the request data D10 received in step S33 is the second request data, the slave device 12 transmits the response data D20 including the 2-byte specific stored data. Further, when the request data D10 received in step S33 is the first request data, the slave device 12 transmits the response data D20 including stored data of one byte included in an address range continuous from a start address, with the second address as the start address.

<Step S35>

In step S35, the slave device 12 determines whether or not the reception of the clock signal SIG10 has been completed.

Here, when the slave device 12 determines that the reception of the clock signal SIG10 has been completed (Yes in step S35), the slave device 12 shifts the processing to step S36. Further, when the reception of the clock signal SIG10 has not been completed (No in step S35), the slave device 12 waits for the end of reception of the clock signal SIG10 in step S35.

Here, when the request data D10 received in step S33 is the second request data, the transmission of the response data D20 ends at the same time as the reception of the clock signal SIG10 ends. On the other hand, when the request data D10 received in step S33 is the first request data, the transmission of the response data D20 ends before the reception of the clock signal SIG10 including the number of clocks capable of transmitting the specific stored data ends.

<Step S36>

In step S36, the slave device 12 determines whether or not a predetermined third time has elapsed from the end of reception of the clock signal SIG10. The third time is an arbitrary time set for waiting for the notification of the completion of the data transmission from the master device 4.

Here, when the slave device 12 determines that the third time has elapsed from the end of reception of the clock signal SIG10 (Yes in step S36), the slave device 12 ends the response data transmission process. Further, when the third time has not elapsed from the end of reception of the clock signal SIG10 (No in step S36), the slave device 12 shifts the process to step S37.

<Step S37>

In step S37, the slave device 12 determines whether or not the master device 4 has notified of the completion of data transmission. Specifically, the slave device 12 determines that the master device 4 has notified of the completion of data transmission when the EN signal line 83 is asserted.

Here, when the slave device 12 determines that the master device 4 has notified of the completion of data transmission (Yes in step S37), the slave device 12 shifts the process to step S38. Further, when the master device 4 does not notify of the completion of data transmission (No in step S37), the slave device 12 shifts the process to step S36.

For example, when the EN signal line 83 is disconnected, the slave device 12 cannot recognize the assertion of the EN signal line 83 by the master device 4. In this case, since the third time elapses before the assertion of the EN signal line 83 is confirmed in the slave device 12, the response data transmission process ends. Then, since the response data transmission process ends without the slave device 12 notifying of the completion of the data transmission (without executing the process of step S39), occurrence of the communication abnormality in the serial bus 8 is detected in step S21 of the communication state confirmation process.

<Step S38>

In step S38, the slave device 12 determines whether or not a first data amount (data amount of specific stored data) corresponding to the second request data transmitted from the master device 4 matches the second data amount corresponding to the response data D20 transmitted in step S34 (the amount of stored data included in the response data D20) on the basis of the clock signal SIG10 input from the master device 4. Here, the process of step S38 is executed by the first determination processor 25 of the slave device 12.

Specifically, when the transmission of the response data D20 ends at a timing when a determination is made in step S35 that the reception of the clock signal SIG10 ends, the slave device 12 determines that the first data amount matches the second data amount.

Here, when the slave device 12 determines that the first data amount matches the second data amount (Yes in step S38), the slave device 12 shifts the process to step S39. Further, when the first data amount does not match the second data amount (No in step S38), the slave device 12 ends the response data transmission process.

<Step S39>

In step S39, the slave device 12 notifies of the completion of data transmission. Specifically, the master device 4 asserts the INT signal line 86. Here, the process of step S39 is executed by the output processor 26 of the slave device 12.

Thus, in the image forming apparatus 2, a communication abnormality of the serial bus 8 caused by the disconnection of the SDO signal line 82 is detected on the basis of the amount of stored data included in the response data D20 transmitted from the slave device 12 in response to the transmission of the request data D10 from the master device 4. Accordingly, it is possible to detect the communication abnormality of the serial bus 8 caused by disconnection of the SDO signal line 82 used for data transmission from the master device 4 to the slave device 12 regardless of the stored content of the storage device 14 of the slave device 12.

Further, in the image forming apparatus 2, the second request data is transmitted from the master device 4 to the slave device 12 according to the arrival of the transmission timing. This makes it possible to detect the communication abnormality of the serial bus 8 at an arbitrary timing. A configuration in which the master device 4 does not include the transmission processor 27 can be considered as another embodiment.

The report processor 29 may report a signal line that can be considered to be a cause of the communication abnormality. For example, when the determination is made in step S17 of the communication status confirmation process that the stored data included in the response data D20 is not the specific stored data, the report processor 29 may report that the communication abnormality is likely to occur due to an abnormality of the SDI signal line 84. Further, when the determination is made in step S15 of the communication status confirmation process that the first time has elapsed from the execution of the process of step S14, the report processor 29 may report that communication abnormality is likely to occur due to an abnormality of at least one of the CLK signal line 81, the SDO signal line 82, the EN signal line 83, the CS signal line 85, and the INT signal line 86. Further, the slave device 12 may notify the master device 4 of the signal line suspected of having a communication abnormality. For example, when the slave device 12 determines in step S38 of the response data transmission process that the first data amount does not match the second data amount, the slave device 12 may notify the master device 4 of the fact using the INT signal line 86 or other notification means. In this case, the master device 4 may report that a communication abnormality is likely to occur due to an abnormality in the SDO signal line 82 on the basis of the notification from the slave device 12.

Further, the master device 4 may transmit another signal capable of specifying the first data amount instead of the clock signal SIG10.

Further, the first determination processor 25 and the output processor 26 may be provided in the master device 4. That is, the master device 4 may determine whether or not the first data amount matches the second data amount on the basis of the clock signal SIG10 transmitted from the slave device 12 to the master device 4. In this case, the clock signal SIG10 is a signal for specifying the second data amount. The slave device 12 may output the clock signal SIG10 having the number of clocks required for the master device 4 to transmit the request data D10 and receive the response data D20.

While the present disclosure has been described in detail with reference to the embodiments thereof, it would be apparent to those skilled in the art various changes and modifications may be made within the scope defined by the appended claims.

What is claimed is:

1. An image forming apparatus comprising:
a master device;
a slave device including a storage device configured to store predetermined specific stored data and stored data with a data amount different from the data amount of the specific stored data;
a serial bus including a first signal line used for transmission of second request data including a request for readout of the specific stored data from the master device to the slave device, a second signal line used for transmission of response data corresponding to the readout request from the slave device to the master device, and a third signal line used for transmission of a data amount specifying signal for specifying a first data amount of the specific stored data serving as a readout target in the readout request included in the second request data or a second data amount of the stored data or the specific stored data included in the response data; and
a first control circuit including a processor and functioning, by the processor executing a control program, as:
a determination processor configured to determine whether or not the first data amount corresponding to the second request data matches the second data amount corresponding to the response data transmitted from the slave device via the second signal line in response to the transmission of the second request data on the basis of the data amount specifying signal when the second request data is transmitted from the master device via the first signal line, and
an output processor configured to output a determination result of the determination processor,
wherein, in a case in which the second request data is transmitted from the master device when the first signal line is disconnected, the slave device receives first request data including a request for readout of the stored data, and in a case in which the second request data is transmitted from the master device when the first signal line is connected, the slave device receives the second request data, and
wherein the slave device is provided in an image formation device configured to form an image on a basis of image data on a sheet.

2. The image forming apparatus according to claim 1, wherein the data amount specifying signal is a clock signal including the number of clocks corresponding to the first data amount or the second data amount.

3. The image forming apparatus according to claim 1, wherein the third signal line is used for transmission of the data amount specifying signal for specifying the first data amount from the master device to the slave device, and
the first control circuit is provided in the slave device.

4. The image forming apparatus according to claim 3, wherein the master device has a second control circuit including a processor, and functioning as a transmission processor by the processor executing a control program, the transmission processor transmitting the second request data having the data amount different from that of the first request data to the slave device.

5. The image forming apparatus according to claim 4, wherein the output processor notifies the master device of a determination result of the determination processor, and
the second control circuit of the master device further functions as a report processor, the report processor reporting occurrence of a communication abnormality of the first signal line when the output processor does not notify of a determination result indicating that the first data amount matches the second data amount in response to the transmission of the second request data from the transmission processor or when data included in the response data transmitted from the slave device in response to the transmission of the second request data from the transmission processor is not the specific stored data.

6. The image forming apparatus according to claim 1, further comprises another slave device,
wherein another slave device is provided in one of a paper feeding device configured to feed a sheet on which an image is formed, an image reading device configured to read an image from a document, and a document transport device configured to transport the document.

7. The image forming apparatus according to claim 5, further comprising:
a display device,
wherein the report processor causes the display device to display a message indicating the occurrence of the communication abnormality of the first signal line.

8. A communication abnormality detection method executed by an image forming apparatus including a master device, a slave device including a storage device configured to store predetermined specific stored data and stored data with a data amount different from the data amount of the specific stored data, and a serial bus including a first signal line used for transmission of second request data including a request for readout of the specific stored data from the master device to the slave device, a second signal line used for transmission of response data corresponding to the readout request from the slave device to the master device, and a third signal line used for transmission of a data amount specifying signal for specifying a first data amount of the specific stored data serving as a readout target in the readout request included in the second request data or a second data amount of the stored data or the specific stored data included in the response data,
wherein, in a case in which the second request data is transmitted from the master device when the first signal line is disconnected, the slave device receives first request data including a request for readout of the stored data, and in a case in which the second request data is transmitted from the master device when the first signal line is connected, the slave device receives the second request data, and
wherein the slave device is provided in an image formation device configured to form an image on a basis of image data on a sheet, and
the communication abnormality detection method comprising:
determining whether or not the first data amount corresponding to the second request data matches the second data amount corresponding to the response data transmitted from the slave device via the second signal line in response to the transmission of the second request data on the basis of the data amount specifying signal when the second request data is transmitted from the master device via the first signal line; and outputting a result of the determination as to whether or not the first data amount matches the second data amount.

* * * * *